(12) United States Patent
Chung et al.

(10) Patent No.: US 12,229,809 B2
(45) Date of Patent: Feb. 18, 2025

(54) METHOD AND COMPUTER-READABLE MEDIUM FOR PROVIDING SERVICE INFORMATION INCLUDING BILL CUSTOMIZED TO USER

(71) Applicant: CODIT Corp., Seoul (KR)

(72) Inventors: Ji Eun Chung, Seongnam-si (KR); Hee Joon Lee, Seoul (KR)

(73) Assignee: CODIT Corp., Seoul (KR)

( * ) Notice: Subject to any disclaimer, the term of this patent is extended or adjusted under 35 U.S.C. 154(b) by 64 days.

(21) Appl. No.: 17/902,849

(22) Filed: Sep. 4, 2022

(65) Prior Publication Data
US 2023/0214887 A1 Jul. 6, 2023

(30) Foreign Application Priority Data
Jan. 4, 2022 (KR) .......... 10-2022-0000754

(51) Int. Cl.
*G06Q 30/04* (2012.01)
*G06Q 30/02* (2023.01)
*G06Q 30/06* (2023.01)

(52) U.S. Cl.
CPC ......... *G06Q 30/0281* (2013.01); *G06Q 30/04* (2013.01)

(58) Field of Classification Search
CPC .......................... G06Q 30/0281; G06Q 30/04
USPC .......................................................... 705/34
See application file for complete search history.

(56) References Cited

U.S. PATENT DOCUMENTS 11,676,012 B2 * 6/2023 Jung ................. G06N 3/08
706/25
2023/0081166 A1 * 3/2023 Codio ............... G06F 21/6245
726/26

FOREIGN PATENT DOCUMENTS

| KR | 10-2016-0072681 | 6/2017 | |
|----|-----------------|--------|--|
| KR | 10-2018-0097594 | 8/2019 | |
| KR | 10-2019-0002208 | 7/2020 | |
| KR | 10-2020-0035770 | 10/2021 | |
| WO | WO-2023048747 A1 * | 3/2023 | .......... G06F 11/3003 |

OTHER PUBLICATIONS

Office Action for Korea Patent Application No. 10-2022-0000754, mailed on Feb. 22, 2022.

* cited by examiner

*Primary Examiner* — Garcia Ade (57) ABSTRACT

The present invention relates to a method and a computer-readable medium for providing service information including a bill customized to a user, in which when company information and industry information are received from the user through a first interface, one or more higher-order keywords are derived based on the company information and the industry information, a plurality of information to which one or more lower-order keywords matching an initial logical relation for a specific higher-order keyword selected by the user are mapped are provided to the user through a second interface according to the initial logical relation between one or more lower-order keywords that are set to each of the one or more higher-order keywords, and the user changes the initial logical relation that is preset to the specific higher-order keyword through a third interface so as to additionally receive a plurality of information matching the changed logical relation.

6 Claims, 8 Drawing Sheets

| Company information | Industry Information | Higher-order keyword | Basic keyword setting | Lower-order keyword |
|---|---|---|---|---|
| | | Policy | | Company A OR OTT OR Content provider OR Online video service |
| Company A | OTT | Network | Company A OR OTT OR Content provider OR Online video service | Internet network OR B communication OR Network usage price OR Network usage fee OR Network neutrality |
| | | Content | | Content AND Production) AND (Policy OR Regulation) |
| | | Copyright | | (Copyright) AND (IP OR Intellectual property) |
| | | Outsourcing production | | Outsourcing AND Production |
| | | Tax and development fund | | Tax OR Duty OR Fund |
| | | Promotion of rights and interests of impaired people | | Impaired people OR Barrier-free OR Barrier |

FIG. 5

| | CODIT | | | | | | | | About CODIT | Apply for 1:1 demo | ⊗ KJV ▾ | ⋎ |
|---|---|---|---|---|---|---|---|---|---|---|---|---|
| ■ Media & Entertainment | Insight | CODIT Search ▾ | CODIT 360° ▾ | | | | | | | | | |
| ▲ Related companies and industries | | Bill | News | Person | SNS | Report | | | | | | |
| Company A ⋎ | | Please input search terms | | | 🔍 | ⦿ Reset settings | | | | | | |
| ⦁ OTT | | Company A | | | | | | | | | | |
| ▲ Related issues ⓘ | | ⦿ News  ○ Bill name  ○ Bill content  ○ Representative proposer  ○ Bill number | 6 related bills | | | | | | | | | |
| ≟ All | | | | | | | | | ⇊ Latest first | ↑⇊ Oldest first | | |
| ≟ All issues | | Proposal date | Bill name | | | | | Representative proposer | Representative proposer affiliation | Bill number | Competent committee | Voting date | Result |
| ⚲ Policy | | 2021-11-25 | Partial amendment bill to the Telecommunications Business Act ⊡ ⤴ In early November, Company A has visited the National Assembly and government ministries to exhibit continuous active communication cooperation with domestic telecommunication service providers is expected for the payment of network usage fees in Korea. However, the company maintains the position that it will not pay the network usage fees, rather claiming that when the service usage fee will be increased and the usage fee will be increased when the network usage fee is paid.... | | | | | Won-ok Lee | Democratic Party of Korea | 2113523 | — | Undecided | Received |
| ※ Network | | 2021-11-19 | Partial amendment bill to the Telecommunications Business Act ⊡ ⤴ According to the data of the Ministry of Science and ICT, the total traffic, other than LTE, 5G, WiFi, and WiBro, that has occurred in Korea in the past five years has exploded from 3,702,202 terabytes (TB) in 2017 to 7,837,438 terabytes (TB) in 2020, and is predicted to record 8,948,535 terabytes (TB) this year with the same trend. As described above, online services are affecting the society at large... | | | | | Sang-hee Kim | Democratic Party of Korea | 2113421 | Science, ICT, Broadcasting, and Communications Committee | Undecided | Received by competent committee |
| ⊚ Content ⦁ ⋎ | | | | | | | | | | | | | |
| ⦿ Tax and development fund | | | | | | | | | | | | | |
| ⦿ Protection and promotion of rights and interests of users ⦁ ⋎ | | 2021-07-15 | Partial amendment bill to the Telecommunications Business Act ⊡ ⤴ As the services of large content providers such as Company G and Company A account for 30% or more of domestic Internet traffic generation, their influences on the domestic internet network usage environment are increasing with each passing day. However, such large content providers use the networks constructed by domestic Internet service providers and their... | | | | | Young-sik Kim | People Power Party | 2111519 | Science, ICT, Broadcasting, and Communications Committee | Undecided | Received by competent committee |
| ⦿ Broadcast ⋎ | | | | | | | | | | | | | |
| ⦿ Game ⦁ ⋎ | | 2021-05-13 | Partial amendment bill to the Telecommunications Business Act ⊡ ⤴ Recently, after a YouTuber revealed that the speed of the '10 GB Internet service' provided by K is actually much lower than 10 GB, users' interest and suspicions about the speed of the Internet service provided by telecommunication service providers are increasing. Currently, telecommunication companies that provide Internet services such as Telecommunication company J, Telecommunication company K, and Telecommunication company L provide '10 GB Internet... | | | | | Sang-hee Kim | Democratic Party of Korea | 2110082 | Science, ICT, Broadcasting, and Communications Committee | Undecided | Received by competent committee |
| ⦿ Data and AI ⦁ | | | | | | | | | | | | | |
| | | 2021-04-01 | Partial amendment bill to the Telecommunications Business Act ⊡ ⤴ Through the amendment of the 「Telecommunication Business Act」 last year, last year, value-added telecommunication service providers who meet certain standards are required to take necessary measures such as ensuring service stabilization means and handling user requests, and a case where there is no address or sales office in Korea, the use | | | | | Jae-il Byun | Democratic Party of Korea | 2109261 | Science, ICT, Broadcasting, and Communications Committee | Undecided | Received by competent committee |

FIG. 6

| | CoDIT | | | | | Insight | CODIT Search ▾ | CODIT 360˚ ▾ | | | About CODIT | Apply for 1:1 demo | ⊛ KJ ▾ | ⌄ |
|---|---|---|---|---|---|---|---|---|---|---|---|---|---|---|
| ■ Media & Entertainment | | | | | | Bill | News | Person | SNS | Report | | | | |
| ▲ Related companies and industries | | | | | | Please input search terms | | | 🔍 | ⊙ Reset settings | | | | |
| Company A ⌄ | | | | | | ⊙ All | ○ Bill name | ○ Bill content | ○ Representative proposer | ○ Bill number | 227 related bills | | ⇩ Latest first | ⇧ Oldest first |
| Company Z Prime Service | | | | | | Proposal date | Bill name | | | Representative proposer | Representative proposer affiliation | Bill number | Competent committee | Voting date | Result |
| Company W | | | | | | | Partial amendment bill to the Act on the Prohibition of Discrimination against Persons with Disabilities and Remedy against Infringement of their Rights, etc. 💬 ↪ | | | | | | | |
| Company Y Play | | | | | | 2021-11-25 | As the media environment has changed rapidly and mobile devices have become common, "Online video provision service (Over The Top, OTT)" that provides contents through the Internet has emerged. Recently, due to the prolonged Corona Virus Infectious Disease-19, the use of online video services is increasing as people refrain from outside activities and spend more time at home... | | | Ye-ji Kim | People Power Party | 2113528 | — | Undecided | Received |
| Company X Plus | | | | | | | | | | | | | | | |
| Company T | | | | | | | | | | | | | | | |
| Company Q | | | | | | | | | | | | | | | |
| Company U | | | | | | | Partial amendment bill to the Act on the Promotion of the Motion Pictures and Video Product 💬 ↪ | | | | | | | |
| Company S | | | | | | 2021-11-25 | According to the current law, when a video product is to be distributed in Korea, the video product should be rated by the Korea Media Rating Board in advance. Recently, due to the expansion of the over-the-top (OTT) market, the number of videos that are subject to the rating is increasing (as of August 2021, 2,394 cases have increased as compared with the previous year), and the rating processing period has also increased by five business days or more as compared with the previous year. According... | | | Jung Park | Democratic Party of Korea | 2113538 | — | Undecided | Received |
| Company P | | | | | | | | | | | | | | | |
| Company Q | | | | | | | | | | | | | | | |
| S Service TV | | | | | | | Partial amendment bill to the Act on Promotion of Information and Communications Network Utilization and Information Protection, etc. 💬 ↪ | | | | | | | |
| Company R TV Plus | | | | | | 2021-11-25 | Although the current law aims to promote the use of information and communications networks, assist those who use information and communications services, and create an environment for using the information and communications networks in a sound and safe manner, no measures have been taken to enhance accessibility for impaired people. In the past, people watched broadcast programs on television... | | | Ye-ji Kim | People Power Party | 2113530 | — | Undecided | Received |
| Company E OTT | | | | | | | | | | | | | | | |
| Company H Premium | | | | | | | Partial amendment bill to the Telecommunications Business Act 💬 ↪ | | | | | | | |
| △ OTT | | | | | | 2021-11-25 | In early November, Company A has visited the National Assembly and government ministries to exhibit continuous active communication, cooperation with domestic telecommunication service providers is expected for the payment of network usage fees in Korea. However, the company maintains the position that it will not pay the network usage fees, rather claiming that when the service usage fee will be increased and the usage fee will be increased when the network usage fee is paid... | | | Won-ok Lee | Democratic Party of Korea | 2113523 | — | Undecided | Received |
| A10 | | | | | | | Partial amendment bill to the Framework Act on Cultural Industry Promotion 💬 ↪ | | | | | | | |
| | | | | | | 2021-11-24 | Recently, Korean movies, dramas, webtoons, and web novels have become very popular around the world, leading the Korean Wave. However, in some cases, key telecommunication service providers and broadcasters engaged in production, sales, distribution, etc. may request writers, etc. for inappropriate dual contracts and unbalanced profit distribution structures without any reasonable reason, and the creative environment... | | | Chung-rae Chung | Democratic Party of Korea | 2113517 | Science, ICT, Broadcasting, and Communications Committee | Undecided | Received |

FIG. 7

Please set up a logical relation for a higher-order keyword 'Policy'.

Lower-order keyword: Jurisdiction, Audiovisual media service, Legal status, Legislation Logical operator: AND, OR, NOT (Legal status OR Legislation) AND Audiovisual media service NOT Jurisdiction

FIG. 8

METHOD AND COMPUTER-READABLE MEDIUM FOR PROVIDING SERVICE INFORMATION INCLUDING BILL CUSTOMIZED TO USER

BACKGROUND OF THE INVENTION

1. Field of the Invention

The present invention relates to a method and a computer-readable medium for providing service information including a bill customized to a user, and more particularly, to a method and a computer-readable medium for providing service information including a bill customized to a user, in which one or more lower-order keywords are mapped to each of a plurality of bills, a plurality of news, a plurality of person information, and a plurality of reports corresponding to information to be provided to the user, when company information and industry information for search target information are received from the user through a first interface, one or more higher-order keywords are derived based on the company information and the industry information, a plurality of information to which one or more lower-order keywords matching an initial logical relation for a specific higher-order keyword selected by the user are mapped are provided to the user through a second interface according to the initial logical relation between one or more lower-order keywords that are set to each of the one or more higher-order keywords, and the user changes the initial logical relation that is preset to the specific higher-order keyword through a third interface that is separately provided so as to additionally receive a plurality of information matching the changed logical relation.

2. Description of the Related Art

Recently, in order to prepare for a change in a management paradigm such as ESG management, or prepare for a rapid change in relevant laws and policies as technology changes rapidly, a process of investigating relevant legal and policy issues is required in business that is currently being operated or in discovering new business. Accordingly, recently, a service for providing legal information or policy information desired by a user to the user has emerged.

In detail, Related Patent 1 (Korean Patent Registration No. 10-2252096, registered on May 10, 2021) discloses a service for processing proceedings of legislative activities performed in the National Assembly to provide the processed proceedings to a user. According to Related Patent 1, proceedings including a keyword (search term) input by the user are provided, and a plurality of additional information such as a current list of frequently spoken words based on proceedings selected by the user among the provided proceedings are provided. However, in the case of Related Patent 1, as described above, only proceedings including the same keyword as the keyword input by the user are provided as search results, so that it is difficult to effectively provide a search result when the user does not have prior knowledge on legal and policy terms.

Therefore, in order to solve the problems described above, a method for providing, in a case where a user inputs a keyword in a general term, information such as a bill including other keywords related to the keyword even when the bill does not include the keyword is required.

In addition, even when one or more other keywords related to the keyword input by the user are provided, the user may request more detailed search results, such as excluding a specific keyword from the search results while all the remaining keywords among the provided keywords are included in the search results. However, there is no service that implements a function capable of meeting such a request among services for providing search results for laws and policies such as current bills. Therefore, there is a demand for developing a new method for solving the above problems and improving technical requirements.

SUMMARY OF THE INVENTION

The present invention relates to a method and a computer-readable medium for providing service information including a bill customized to a user, and more particularly, an object of the present invention is to provide a method and a computer-readable medium for providing service information including a bill customized to a user, in which one or more lower-order keywords are mapped to each of a plurality of bills, a plurality of news, a plurality of person information, and a plurality of reports corresponding to information to be provided to the user, when company information and industry information for search target information are received from the user through a first interface, one or more higher-order keywords are derived based on the company information and the industry information, a plurality of information to which one or more lower-order keywords matching an initial logical relation for a specific higher-order keyword selected by the user are mapped are provided to the user through a second interface according to the initial logical relation between one or more lower-order keywords that are set to each of the one or more higher-order keywords, and the user changes the initial logical relation that is preset to the specific higher-order keyword through a third interface that is separately provided so as to additionally receive a plurality of information matching the changed logical relation.

To achieve the objects described above, there is provided a method for providing service information including a bill customized to a user, which is performed in a computing system configured to perform communication with a user terminal and including one or more processors and one or more memories, the method including: a first interface provision step of providing a first interface for receiving company information and industry information to the user terminal, in which each of a plurality of bills, a plurality of news, a plurality of person information, and a plurality of reports stored in the computing system is mapped to one or more lower-order keywords; a higher-order keyword derivation step of deriving one or more higher-order keywords based on the company information and the industry information received through the first interface in the user terminal; and a second interface provision step of providing a second interface for displaying one or more information corresponding to the derived one or more higher-order keywords among the bills, the news, the person information, and the reports to the user terminal, wherein one or more lower-order keywords and an initial logical relation between the one or more lower-order keywords are set to the higher-order keyword, the second interface provided in the second interface provision step includes: a higher-order keyword layer for displaying the one or more higher-order keywords derived in the higher-order keyword derivation step; and a content layer for displaying the one or more information among the bills, the news, the person information, and the reports corresponding to a specific higher-order keyword selected by the user in the higher-order keyword layer, and the one or more information displayed in the content layer corresponds to one or more of bills, news, person information, and reports to which one or more lower-order keywords corresponding to a positive logical relation are mapped according to an initial logical relation that is set to the selected specific higher-order keyword.

According to one embodiment of the present invention, the method for providing the service information including the bill customized to the user may further include a third interface provision step of providing a third interface through which the user sets the initial logical relation that is set to the specific higher-order keyword selected by the user in the higher-order keyword layer to the user terminal according to a request of the user terminal, wherein a plurality of preset logical operators may be displayed in the third interface provided in the third interface provision step, and the user may change the initial logical relation for the specific higher-order keyword by using one or more lower-order keywords that are set to the selected specific higher-order keyword and one or more logical operators included in the logical operators through the third interface.

According to one embodiment of the present invention, the logical operators displayed in the third interface may include: a first logical operator for calculating a bill, news, person information, and a report including one lower-order keyword among a plurality of lower-order keywords corresponding to arguments; a second logical operator for calculating a bill, news, person information, and a report including all of the lower-order keywords corresponding to the arguments; and a third logical operator for calculating a bill, news, person information, and a report, which do not include a specific lower-order keyword corresponding to the argument.

According to one embodiment of the present invention, the first interface provided through the first interface provision step may include: a company information input region for receiving the company information; and a candidate list display region for displaying a plurality of preset candidate industry information according to the company information with respect to the company information received in the company information input region, and specific candidate industry information selected by the user among the candidate industry information displayed in the candidate list display region may correspond to the industry information.

According to one embodiment of the present invention, each of the bills, the news, the person information, and the reports stored in the computing system may be further mapped to one or more company information or one or more industry information, and the one or more information displayed in the content layer may correspond to one or more information matching the initial logical relation that is set to the specific higher-order keyword among a plurality of bills, a plurality of news, a plurality of person information, and a plurality of reports, which are mapped to company information or industry information corresponding to the selected specific higher-order keyword.

To achieve the objects described above, there is provided a computer-readable medium for implementing a method for providing service information including a bill customized to a user, which is performed in a computing system configured to perform communication with a user terminal and including one or more processors and one or more memories, wherein the computer-readable medium stores instructions for causing the computing system to perform: a first interface provision step of providing a first interface for receiving company information and industry information to the user terminal, in which each of a plurality of bills, a plurality of news, a plurality of person information, and a plurality of reports stored in the computing system is mapped to one or more lower-order keywords; a higher-order keyword derivation step of deriving one or more higher-order keywords based on the company information and the industry information received through the first interface in the user terminal; and a second interface provision step of providing a second interface for displaying one or more information corresponding to the derived one or more higher-order keywords among the bills, the news, the person information, and the reports to the user terminal, one or more lower-order keywords and an initial logical relation between the one or more lower-order keywords are set to the higher-order keyword, the second interface provided in the second interface provision step includes: a higher-order keyword layer for displaying the one or more higher-order keywords derived in the higher-order keyword derivation step; and a content layer for displaying the one or more information among the bills, the news, the person information, and the reports corresponding to a specific higher-order keyword selected by the user in the higher-order keyword layer, and the one or more information displayed in the content layer corresponds to one or more of bills, news, person information, and reports to which one or more lower-order keywords corresponding to a positive logical relation are mapped according to an initial logical relation that is set to the selected specific higher-order keyword.

According to one embodiment of the present invention, when the company information and the industry information are received from the user, one or more higher-order keywords corresponding to the company information and the industry information are derived, and service information including a bill, news, person information, and a report to which one or more lower-order keywords corresponding to a positive logical relation are mapped is provided to the user according to an initial logical relation that is set between one or more lower-order keywords assigned to each of the one or more higher-order keywords, so that the service information on the bill, the news, the person information, and the report, which are related to the company information and the industry information input by the user and do not directly include the company information and the industry information, can be provided.

According to one embodiment of the present invention, the user may arbitrarily change the initial logical relation between one or more preset lower-order keywords with respect to the specific higher-order keyword selected by the user through the third interface provided to the user terminal, so that detailed search results required by the user can be provided in addition to the initial logical relation.

According to one embodiment of the present invention, when the company information is received from the user through the company information input region included in the first interface, one or more candidate industry information corresponding to the company information may be displayed, and the user may receive the industry information by selecting specific candidate industry information among the candidate industry information, so that the user can easily input the industry information related to the company information.

BRIEF DESCRIPTION OF THE DRAWINGS

FIG. 5 schematically shows a first interface according to one embodiment of the present invention.

FIG. 6 schematically shows a first interface according to another embodiment of the present invention.

DETAILED DESCRIPTION OF THE INVENTION

Hereinafter, various embodiments and/or aspects will be described with reference to the drawings. In the following description, numerous specific details are set forth in order to provide a thorough understanding of one or more aspects for the purpose of explanation. However, it will also be appreciated by a person having ordinary skill in the art that such aspect(s) may be carried out without the specific details. The following description and accompanying drawings will be set forth in detail for specific illustrative aspects among one or more aspects. However, the aspects are merely illustrative, some of various ways among principles of the various aspects may be employed, and the descriptions set forth herein are intended to include all the various aspects and equivalents thereof.

In addition, various aspects and features will be presented by a system that may include a plurality of devices, components and/or modules or the like. It will also be understood and appreciated that various systems may include additional devices, components and/or modules or the like, and/or may not include all the devices, components, modules or the like recited concerning the drawings.

The term "embodiment", "example", "aspect", "exemplification", or the like as used herein may not be construed in that an aspect or design set forth herein is preferable or advantageous to other aspects or designs. The terms 'unit', 'component', 'module', 'system', 'interface' and the like used in the following generally refer to a computer-related entity, may refer to, for example, hardware, software, or a combination of hardware and software.

In addition, the terms "include" and/or "comprise" specify the presence of the corresponding feature and/or element, but do not preclude the possibility of the presence or addition of one or more other features, elements or combinations thereof.

In addition, the terms including an ordinal number such as first and second may be used to describe various elements, however, the elements are not limited by the terms. The terms are used only to distinguish one element from another element. For example, the first element may be referred to as the second element without departing from the scope of the present invention, and similarly, the second element may also be referred to as the first element. The term "and/or" includes any one of a plurality of relevant listed items or a combination thereof.

In addition, in embodiments of the present invention, all terms used herein including technical or scientific terms, unless defined otherwise, have the same meaning as commonly understood by a person having ordinary skill in the art. Terms such as those defined in generally used dictionaries will be interpreted to have the meaning consistent with the meaning in the context of the related art, and will not be interpreted as an ideal or excessively formal meaning unless expressly defined in an embodiment of the present invention.

Figure 1:
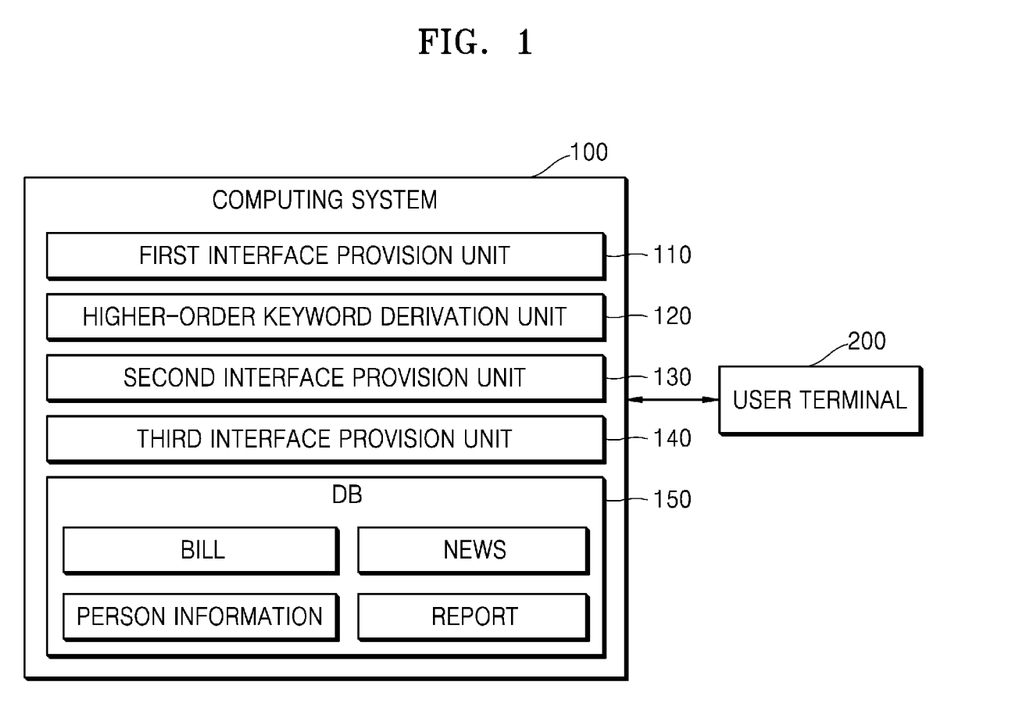
FIG. 1 schematically shows components for performing a method for providing service information including a bill customized to a user according to one embodiment of the present invention.

FIG. 1 schematically shows components for performing a method for providing service information including a bill customized to a user according to one embodiment of the present invention.

As shown in FIG. 1, a computing system 100 may perform communication with a user terminal 200, and may perform a method for providing a service including a bill customized to a user according to the present invention through the communication with the user terminal 200.

In detail, in order to perform the method for providing the service including the bill customized to the user according to the present invention, as shown in FIG. 1, the computing system 100 may include a first interface provision unit 110, a higher-order keyword derivation unit 120, a second interface provision unit 130, a third interface provision unit 140, and a DB 150 in which service information is stored.

The first interface provision unit 110 may perform a first interface provision step S10, and may provide a first interface 1000 for receiving company information and industry information to be searched by the user to the user terminal 200 according to a request of the user terminal 200. The user terminal 200 to which the first interface 1000 is provided may display the first interface 1000, and the user may input the company information and the industry information related to the service information to be provided on the first interface 1000 displayed on the user terminal 200.

The higher-order keyword derivation unit 120 may receive the company information and the industry information input by the user from the user terminal 200 on which the first interface 1000 is displayed, and may derive one or more higher-order keywords related to the company information and/or the industry information based on the company information and the industry information. According to one embodiment of the present invention, the higher-order keyword may correspond to a comprehensive keyword including the company information and/or the industry information, or a legal or political keyword for the company information and/or the industry information. Meanwhile, a relation between the company information and/or the industry information and the one or more higher-order keywords may be stored in the DB 150.

The second interface provision unit 130 may perform a second interface provision step S30, and may provide a second interface to the user terminal 200 that has provided the company information and the industry information, in which the one or more higher-order keywords derived in a higher-order keyword derivation step S20 may be displayed on the second interface. Therefore, the user may select a specific higher-order keyword among the one or more higher-order keywords through the user terminal 200 on which the second interface is displayed, and service information to which one or more lower-order keywords related to the specific higher-order keyword selected by the user are mapped may be displayed on the second interface, which will be described in detail below.

The third interface provision unit 140 may perform a third interface provision step S40, and may provide a third interface 2000 that allows the user to arbitrarily change an initial logical relation that is preset to the specific higher-order keyword to the user terminal 200 when the user selects the specific higher-order keyword through the second interface. In detail, the initial logical relation may include one or more lower-order keywords included in the specific higher-order keyword, and one or more logical operators among preset first to third logical operators, and the user may arbitrarily configure the one or more lower-order keywords and the preset first to third logical operators through the third interface 2000 to receive detailed search results required by the user.

The DB 150 may store the service information provided to the user according to the present invention. In detail, the service information according to the present invention may include one or more information corresponding to the company information and the industry information input by the user among a plurality of bills, a plurality of news, a plurality of person information, and a plurality of reports. Meanwhile, according to the present invention, the report may correspond to a thesis, analysis information written by a third party, and the like corresponding to the company information and/or the industry information, or may correspond to schedule information of the National Assembly and public institutions and a document including policy-related seminars, policy-related issues, and industry trends, which are separately created by a manager of the computing system 100 according to the present invention.

In addition, although not shown in FIG. 1, according to another embodiment of the present invention, the DB 150 may additionally store a plurality of legal information that is being implemented separately from the bill, and the service information may additionally include legal information corresponding to the company information and the industry information input by the user.

Meanwhile, according to the present invention, in order to provide the service information corresponding to the company information and the industry information input by the user, one or more lower-order keywords may be mapped to each of a plurality of information, a plurality of bills, a plurality of news, a plurality of person information, and a plurality of reports, which are stored in the DB 150, and in order to map the one or more lower-order keywords to each of the information, a scheme of providing a sort of task that allows a worker to map the lower-order keyword based on crowdsourcing, or automatically mapping the lower-order keyword in consideration of frequencies and the like of keywords described in each of the information based on a trained machine learning model may be used. To this end, the computing system 100 may further include a separate component for performing the scheme.

In addition, the computing system 100 may be implemented as a single physical device or a plurality of physical devices, in which each of the physical devices may communicate with each other when the computing system 100 is implemented as the physical devices, and components included in the computing system 100 may be distributed to the physical devices, respectively.

Figure 2A:
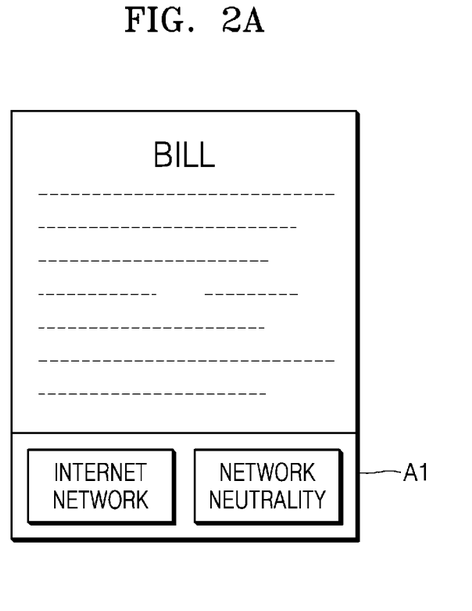
FIGS. 2A and 2B schematically show the bill to which one or more lower-order keywords are mapped according to one embodiment of the present invention.
Figure 2B:
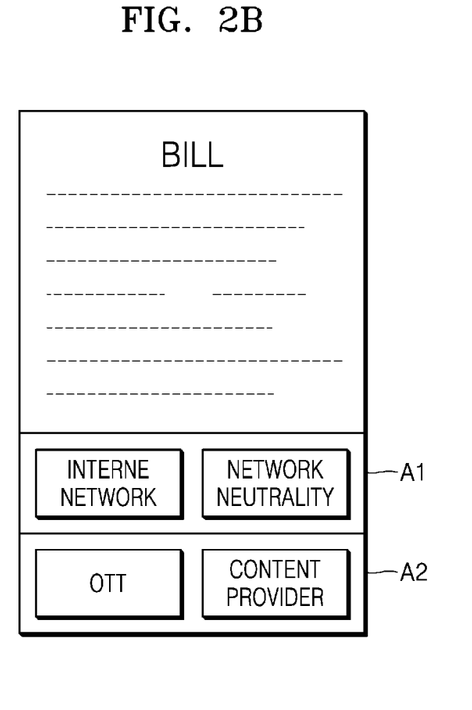

FIGS. 2A and 2B schematically show the bill to which one or more lower-order keywords are mapped according to one embodiment of the present invention.

As described above, in order to provide the service information corresponding to the company information and the industry information input by the user on the first interface 1000, as shown in FIGS. 2A and 2B, the one or more lower-order keywords may be mapped to each of the information, the bills, the news, the person information, and the reports, which are stored in the DB 150. However, FIGS. 2A and 2B show a bill to which one or more lower-order keywords are mapped.

In detail, FIG. 2A schematically shows a bill to which only one or more lower-order keywords are mapped (A1). As shown in FIG. 2A, one or more lower-order keywords ('Internet network' and 'Network neutrality' in FIG. 2A) may be mapped (A1) to information stored in the DB 150 (the bill in FIG. 2A).

Meanwhile, the one or more higher-order keywords may be derived in the higher-order keyword derivation step S20 based on the company information and the industry information input by the user, when the user selects the specific higher-order keyword among the one or more higher-order keywords displayed on the second interface, a plurality of information (one or more bills, news, person information, and reports) to which one or more lower-order keywords corresponding to a positive logical relation in the initial logical relation that is preset to the specific higher-order keyword are mapped (A1) may be included in the service information, and the service information may be transmitted to the user terminal 200 to display the service information on the second interface displayed on the user terminal 200, so that a search result may be provided to the user.

In addition, according to the present invention, the lower-order keyword mapped to each of the information is not limited to a case where the lower-order keyword is mapped only when the lower-order keyword is explicitly described in the information, and may also be mapped in case where the information is semantically related to the lower-order keyword even when the lower-order keyword is not explicitly described in the information.

Meanwhile, FIG. 2B schematically shows a bill to which one or more industry information and/or one or more company information as well as the one or more lower-order keywords are additionally mapped (A2). As shown in FIG. 2B, according to another embodiment of the present invention, the one or more lower-order keywords ('Internet network' and 'Network neutrality' in FIG. 2B) and the one or more company information and/or the one or more industry information ('OTT' and 'Content provider' in FIG. 2B) may be mapped (A1 and A2) to information stored in the DB 150 (the bill in FIG. 2B).

In detail, the one or more company information or the one or more industry information may be additionally mapped (A2) to each of a plurality of bills, a plurality of news, a plurality of person information, and a plurality of reports stored in the computing system 100, and one or more information displayed in a content layer L20 may correspond to one or more information matching the initial logical relation that is set to the specific higher-order keyword among a plurality of bills, a plurality of news, a plurality of person information, and a plurality of reports, which are mapped (A2) to company information or industry information corresponding to the selected specific higher-order keyword.

As described above, as shown in FIG. 2B, according to another embodiment of the present invention, all of the one or more lower-order keywords and the one or more company information and/or the one or more industry information may be mapped (A1 and A2) to each of the information (the bills, the news, the person information, and the reports) included in the service information, so that service information that is more suitable for the company information and the industry information input by the user may be provided.

For example, when the company information input by the user corresponds to 'Company A', and the industry information input by the user corresponds to 'OTT', one or more higher-order keywords according to the company information and the industry information may include 'Network', and when the initial logical relation that is preset to the higher-order keyword 'Network' is used to search for information mapped to a lower-order keyword 'Internet network' or a lower-order keyword 'Network neutrality', as shown in FIG. 2A, a bill to which the lower-order keywords 'Internet network' and 'Network neutrality' are mapped may be included in the service information as a search result.

In this case, when another bill is a bill related to a network neutrality issue that may occur in providing 'Cloud service', the lower-order keywords 'Internet network' and 'Network neutrality' may also be mapped to the bill as in FIG. 2A. In such a situation, when the company information input by the user corresponds to 'Company A', and the industry information input by the user corresponds to 'OTT', in a case where only the lower-order keywords are mapped as in FIG. 2A, the bill related to a cloud service exemplified above may be provided to the user as a search result even when the user has requested information on industry information related to OTT.

Therefore, as shown in FIG. 2B, the one or more industry information and/or the one or more company information may be additionally mapped (A2) to each of the bills, the news, the person information, and the reports stored in the DB 150, so that the one or more information related to the company information and the industry information input by the user may be primarily searched for, and a plurality of information including a lower-order keyword matching the initial logical relation that is preset to the specific higher-order keyword selected by the user or a logical relation that is arbitrarily created by the user among the searched one or more information may be provided to the user. Therefore, a plurality of information requested by the user may be provided more accurately.

Meanwhile, in order to map the one or more lower-order keywords or the one or more industry information and/or the one or more company information to the bills, the news, the person information, and the reports stored in the DB 150, the computing system 100 according to the present invention may perform the mapping on the information by providing the information to a worker terminal in a crowdsourcing scheme to assign a task of performing the mapping on the information, or the computing system 100 according to the present invention may automatically perform the mapping on the information in consideration of frequencies and the like of keywords described in the information or in consideration of distances between the keywords by embedding each of the keywords described in the information in a word-to-vector (Word2Vec) scheme by using the trained machine learning model.

Although the one or more lower-order keywords and the one or more company information and/or the one or more industry information are divisionally mapped (A1 and A2) to each of the information in FIG. 2B, according to another embodiment of the present invention, the one or more lower-order keywords and the one or more company information and/or the one or more industry information may be mapped to each of the information without being separately divided.

Figure 3:
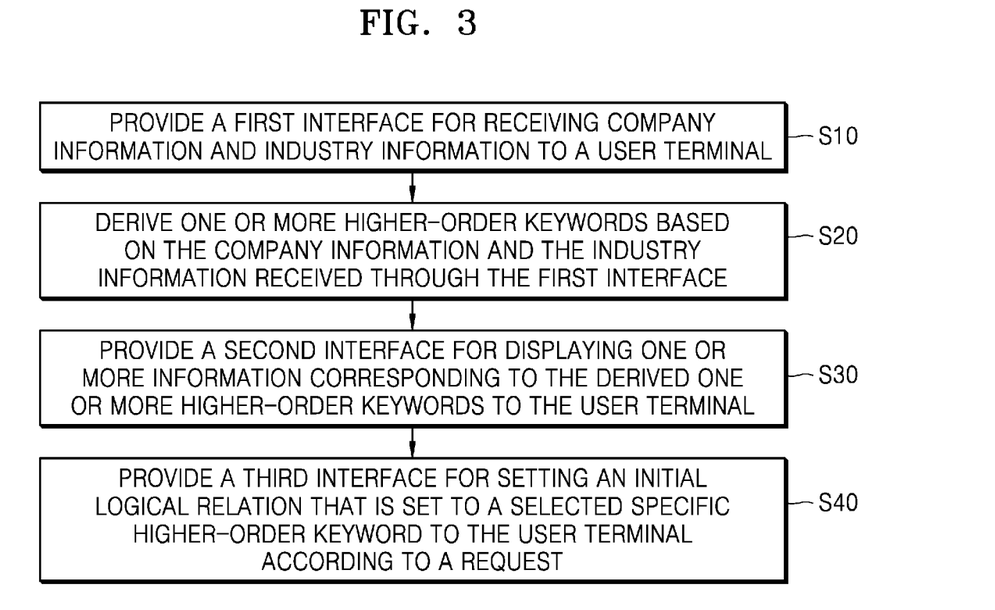
FIG. 3 schematically shows detailed steps of the method for providing the service information including the bill customized to the user according to one embodiment of the present invention.

FIG. 3 schematically shows detailed steps of the method for providing the service information including the bill customized to the user according to one embodiment of the present invention.

As shown in FIG. 3, a method for providing service information including a bill customized to a user may include: a first interface provision step S10 of providing a first interface 1000 for receiving company information and industry information to the user terminal 200, in which each of a plurality of bills, a plurality of news, a plurality of person information, and a plurality of reports stored in the computing system 100 is mapped to one or more lower-order keywords; a higher-order keyword derivation step S20 of deriving one or more higher-order keywords based on the company information and the industry information received through the first interface 1000 in the user terminal 200; and a second interface provision step S30 of providing a second interface for displaying one or more information corresponding to the derived one or more higher-order keywords among the bills, derivation news, derivation person information, and derivation reports to the user terminal 200.

In detail, in the first interface provision step S10, the first interface 1000 may be provided to the user terminal 200 that requests provision of the first interface 1000, the user terminal 200 to which the first interface 1000 is provided may display the first interface 1000, and the user may input the company information and the industry information to be searched for by the user on the displayed first interface 1000.

In the higher-order keyword derivation step S20, the company information and the industry information input by the user on the first interface 1000 may be received from the user terminal 200, and the one or more higher-order keywords corresponding to the company information and the industry information may be derived. Meanwhile, relation information on the one or more higher-order keywords according to a combination of each company information and each industry information may be stored in the computing system 100, and in the higher-order keyword derivation step S20, the relation information may be used to derive the one or more higher-order keywords corresponding to the company information and the industry information input by the user.

Meanwhile, in the second interface provision step S30, the second interface for displaying the one or more higher-order keywords derived in the higher-order keyword derivation step S20 may be provided to the user terminal 200, the user terminal 200 to which the second interface is provided may display the second interface, and the user may select a specific higher-order keyword among the one or more higher-order keywords displayed on the displayed second interface. In this case, the second interface may display service information including information on a bill, news, person information, and a report including one or more lower-order keywords corresponding to an initial logical relation that is preset to the specific higher-order keyword selected by the user.

Meanwhile, the method for providing the service information including the bill customized to the user may further include a third interface provision step S40 of providing a third interface 2000 through which the user sets the initial logical relation that is set to the specific higher-order keyword selected by the user in a higher-order keyword layer L10 to the user terminal 200 according to a request of the user terminal 200.

In detail, the user may select the specific higher-order keyword among the one or more higher-order keywords displayed on the second interface to receive the service information including one or more information matching the initial logical relation that is preset to the specific higher-order keyword as a search result. However, as described above, through the third interface provision step S40, the user may arbitrarily change the initial logical relation by using one or more lower-order keywords included in the initial logical relation that is preset to the specific higher-order keyword selected by the user and a plurality of logical operators that are included in the initial logical relation or provided separately in order to perform detailed search on a plurality of information required by the user.

Through such a configuration, the user may primarily receive the service information including information including the one or more lower-order keywords matching the preset initial logical relation with respect to the selected specific higher-order keyword as the search result, and when the user intends to exclude the information mapped to the specific lower-order keyword from the primarily received search result or intends to include information to which all of a plurality of specific lower-order keywords are mapped, the user may change the initial logical relation through the third interface 2000 to secondarily receive a customized search result required by the user.

Meanwhile, the first interface 1000, the second interface, and the third interface 2000 described above will be described in detail below with reference to FIGS. 5 to 7.

Figure 4:
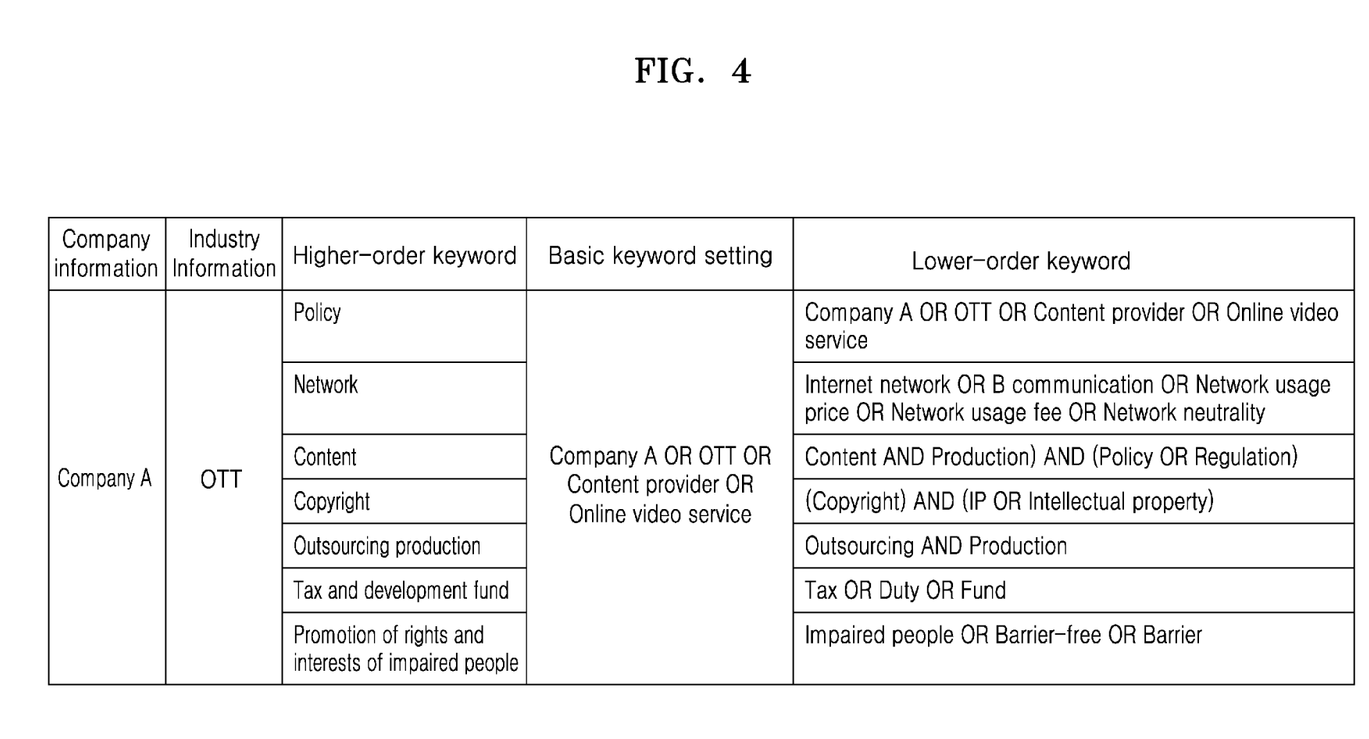
FIG. 4 schematically shows one or more higher-order keywords corresponding to company information and industry information and an initial logical relation that is preset to the one or more higher-order keywords according to one embodiment of the present invention.

FIG. 4 schematically shows one or more higher-order keywords corresponding to company information and industry information and an initial logical relation that is preset to the one or more higher-order keywords according to one embodiment of the present invention.

FIG. 4 schematically shows the one or more higher-order keywords according to the company information and the industry information, a relation between basic keywords, which is preset to the higher-order keyword ('Basic keyword setting' in FIG. 4), and initial logical relations that are preset to the one or more higher-order keywords, respectively.

As described above, information on the one or more higher-order keywords corresponding to the company information and the industry information input by the user, the relation between the basic keywords for the one or more higher-order keywords, and information on the initial logical relations for the one or more higher-order keywords, respectively, may be stored in the computing system 100.

In detail, according to one embodiment of the present invention, FIG. 4 shows one or more higher-order keywords related to 'Company A' and 'OTT', a relation between basic keywords for the higher-order keywords, and initial logical relations for the higher-order keywords, respectively, when the user inputs 'Company A' as the company information, and inputs 'OTT' as the industry information.

When the user inputs 'Company A' as the company information, and 'OTT' as the industry information, in the higher-order keyword derivation step S20, the one or more higher-order keywords ('Policy' or 'Promotion of rights and interests of impaired people' in FIG. 4) related to 'Company A' and 'OTT' may be derived. Meanwhile, the one or more higher-order keywords derived as described above may be displayed on the second interface.

Meanwhile, as described above in FIG. 2B, all of the one or more higher-order keywords corresponding to the company information and the industry information may use the logical relation between the basic keywords ('Basic keyword setting' in FIG. 4) as shown in FIG. 4 in order to first derive one or more information corresponding to the company information and the industry information. In other words, a logical relation between basic keywords for searching for information mapped to a keyword for the company information, a keyword for the industry information, a separate keyword having the same meaning as the company information, or a separate keyword having the same meaning as the industry information may be preset based on the company information and the industry information input by the user, and information to which one or more keywords matching the logical relation between the basic keywords are mapped may be first derived as a search result. Meanwhile, as described in FIG. 2B, information corresponding to a target to be first derived as the search result may correspond to the one or more company information and/or the one or more industry information mapped to each of the information (the bill, the news, the person information, and the report). Meanwhile, according to another embodiment of the present invention, as described in FIG. 2A, the logical relation between the basic keywords may be omitted.

In addition, the initial logical relation including the one or more lower-order keywords included in the higher-order keyword and a plurality of logical operators may be preset to each of the derived one or more higher-order keywords. For example, as shown in FIG. 4, the initial logical relation for the higher-order keyword 'Policy' may be preset to 'Jurisdiction OR Audiovisual media service OR Legal status OR Legislation'. In this case, 'Jurisdiction', 'Audiovisual media service', 'Legal status', and 'Legislation' may correspond to the lower-order keywords included in the higher-order keyword, and 'OR' may correspond to the logical operator. Therefore, in the initial logical relation for 'Policy', a plurality of information to which one or more lower-order keywords are mapped among each lower-order keyword may correspond to information matching the initial logical relation, and the service information including the information may be displayed on the second interface.

A plurality of preset information according to the company information and the industry information shown in FIG. 4 may be initially set by a manager or an operator of the computing system 100. According to another embodiment of the present invention, when the user changes the initial logical relation with respect to the specific higher-order keyword through the third interface 2000, the initial logical relation that is preset for the specific higher-order keyword may be updated in consideration of the logical relation changed by the user, in which the initial logical relation may be updated by the manager or the operator described above, or may be automatically updated in the computing system 100 in consideration of a ranking of the logical relation changed by a plurality of users with respect to the specific higher-order keyword.

FIG. 5 schematically shows a first interface 1000 according to one embodiment of the present invention.

As shown in FIG. 5, one or more lower-order keywords and an initial logical relation between the one or more lower-order keywords may be set to the higher-order keyword, the second interface provided in the second interface provision step S30 may include: a higher-order keyword layer L10 for displaying the one or more higher-order keywords derived in the higher-order keyword derivation step S20; and a content layer L20 for displaying the one or more information of the bills, the news, the person information, and the reports corresponding to a specific higher-order keyword selected by the user in the higher-order keyword layer L10, and the one or more information displayed in the content layer L20 may correspond to one or more bills, news, person information, and reports to which one or more lower-order keywords corresponding to a positive logical relation are mapped according to an initial logical relation that is set to the selected specific higher-order keyword.

According to one embodiment of the present invention, the first interface 1000 provided in the first interface provision step S10 and the second interface provided in the second interface provision step S30 may correspond to separate interfaces, so that the user terminal 200 may display separate interfaces that are different from each other when the user terminal 200 receives the first interface 1000 or the second interface.

Meanwhile, according to another embodiment of the present invention, the first interface 1000 provided in the first interface provision step S10 and the second interface provided in the second interface provision step S30 may correspond to the same interface, and the information displayed on the first interface 1000 and the information displayed on the second interface described above may be displayed together on one interface according to an input of the user. Meanwhile, the interfaces shown in FIGS. 5 and 6 may correspond to interfaces corresponding to the above case where the first interface 1000 and the second interface are the same. Hereinafter, the case where the first interface 1000 and the second interface are implemented as the same one interface will be described, in which the same one interface will be referred to as the first interface 1000. However, the first interface 1000 in a case where the interfaces are implemented as one interface and the first interface 1000 in a case where the interfaces are implemented as separate interfaces may correspond to mutually different interfaces, in which only the descriptions thereof are the same.

In detail, as shown in FIG. 5, the first interface 1000 may include the higher-order keyword layer L10 and the content layer L20, and the higher-order keyword layer L10 may include: a company information input region A10 in which the user inputs the company information and the industry information in the first interface provision step S10; and a higher-order keyword display region A11 for displaying a list of one or more higher-order keywords corresponding to the company information and the industry information input by the user in the second interface provision step S30.

Preferably, when the user does not input the company information and the industry information through the company information input region A10, the one or more higher-order keywords may not be displayed in the higher-order keyword display region A11, and when the company information and the industry information are input through the company information input region A10, the one or more higher-order keywords corresponding to the company information and the industry information may be displayed in the higher-order keyword display region A11.

Meanwhile, the content layer L20 included in the first interface 1000 may display the service information including the information (the bill, the news, the person information, and the report) to which the one or more lower-order keywords matching the initial logical relation that is preset to the specific higher-order keyword are mapped when the user selects the specific higher-order keyword among the one or more higher-order keywords displayed in the higher-order keyword display region A11. The content layer L20 may display all of the service information on one screen, or as shown in FIG. 5, the content layer L20 may include a plurality of tabs (Bill, News, Person, and Report) related to each information included in the service information, and the information included in the service information corresponding to a specific tab may be displayed when the user selects the specific tab. For example, as shown in FIG. 5, when the user selects a tab 'Bill', one or more bill information matching the initial logical relation that is preset to the specific higher-order keyword selected by the user may be displayed on the tab 'Bill'.

In addition, the content layer L20 may display the one or more information corresponding to the initial logical relation that is preset to the specific higher-order keyword selected by the user, and even when the user changes the initial logical relation with respect to the specific higher-order keyword through the third interface 2000 as described above, the content layer L20 may display the one or more information corresponding to the changed initial logical relation.

Meanwhile, as described above, according to the present invention, the matching of the initial logical relation or the changed initial logical relation may mean one or more bills, news, person information, and reports corresponding to a positive logical relation (positive relation) according to a logical relation expression among the bills, the news, the person information, and the reports.

According to another embodiment of the present invention, when the company information and the industry information are not input in the company information input region A10, or the specific higher-order keyword is not selected in the higher-order keyword display region A11, no information may be displayed on the content layer L20, and when the user inputs both on the company information input region A10 and the higher-order keyword display region A11, specific information may be displayed on the content layer L20.

According to still another embodiment of the present invention, when the company information and the industry information are not input in the company information input region A10, or the specific higher-order keyword is not selected in the higher-order keyword display region A11, information on a bill, news, person information, and a report, which are most recently updated, may be initially displayed on the content layer L20.

FIG. 6 schematically shows a first interface 1000 according to another embodiment of the present invention.

As shown in FIG. 6, the first interface 1000 provided through the first interface provision step S10 may include: a company information input region A10 for receiving the company information; and a candidate list display region for displaying a plurality of preset candidate industry information according to the company information with respect to the company information received in the company information input region A10, and specific candidate industry information selected by the user among the candidate industry information displayed in the candidate list display region may correspond to the industry information.

In detail, according to the present invention, the user may directly input the company information or the industry information on the company information input region A10, in which as shown in FIG. 6, when the user inputs specific company information in the company information input region A10, a list of one or more other company information related to the specific company information may be displayed on the company information input region A10, or although not shown in FIG. 6, when the user inputs the specific company information in the company information input region A10, the candidate list display region for displaying one or more candidate industry information related to the specific company information may be displayed on the company information input region A10.

Therefore, even when the user does not receive information related to other companies by selecting the other company information, or does not directly input the industry information, the industry information may be easily selected by selecting the one or more candidate industry information displayed on the candidate list display region.

In detail, as shown in FIG. 6, when the user inputs company information 'Company A' and industry information 'OTT' in the company information input region A10, a plurality of information on one or more other companies ('Company Z Prime Service' to 'Company H Premium' in FIG. 6) may be displayed on the company information input region A10 in consideration of the company information and the industry information. Therefore, the user may easily search for a plurality of information related to a specific other company by selecting the specific company among other companies that are additionally displayed on the company information input region A10 in addition to 'Company A' that is directly input by the user.

Meanwhile, although not shown in FIG. 6, when the user inputs only the company information in the company information input region A10, the candidate list display region for displaying the one or more candidate industry information related to the input company information may be included and displayed in the company information input region A10, and the user may input the industry information on the company information input region A10 according to the present invention by selecting specific industry information among a plurality of candidate industry information displayed in the candidate list display region.

Figure 7:
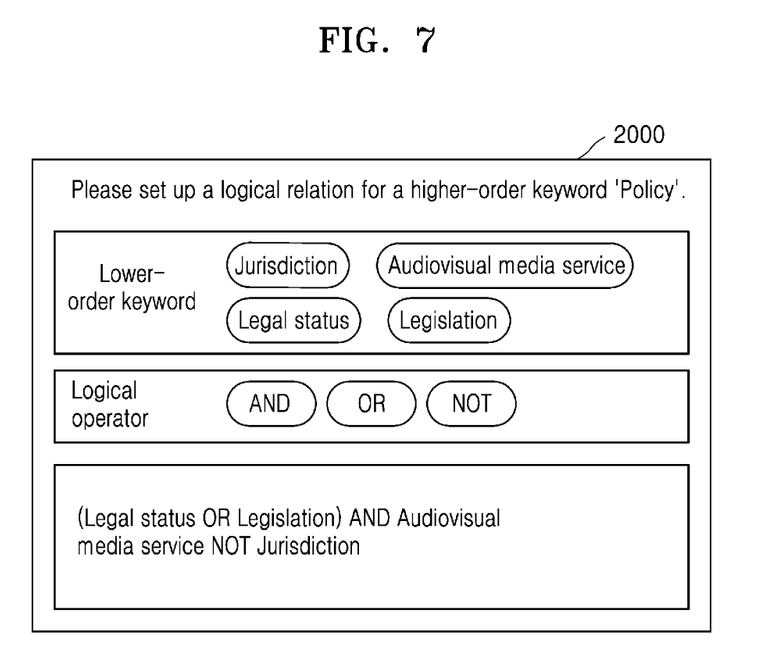
FIG. 7 schematically shows a third interface according to one embodiment of the present invention.

FIG. 7 schematically shows a third interface 2000 according to one embodiment of the present invention.

As shown in FIG. 7, a plurality of preset logical operators may be displayed in the third interface 2000 provided in the third interface provision step S40, and the user may change the initial logical relation for the specific higher-order keyword by using one or more lower-order keywords that are set to the selected specific higher-order keyword and one or more logical operators included in the logical operators through the third interface 2000.

FIG. 7 schematically shows the third interface 2000 that is provided to and displayed on the user terminal 200 through the third interface provision step S40 when a higher-order keyword for 'Policy' among a plurality of higher-order keywords derived by inputting 'Company A' as the company information and 'OTT' as the industry information by the user is selected on the higher-order keyword display region A11 of the first interface 1000, and a request for changing an initial logical relation of the higher-order keyword for 'Policy' is input as shown in FIGS. 4 and 5.

As shown in FIG. 7, the third interface 2000 may display the one or more lower-order keywords ('Jurisdiction', 'Audiovisual media service', 'Legal status', and 'Legislation' in FIG. 7) included in the specific higher-order keyword selected by the user, and may display the logical operators ('AND', 'OR', and 'NOT' in FIG. 7) that may be used to change the initial logical relation of the specific higher-order keyword.

Accordingly, the user may use the displayed one or more lower-order keywords as calculation target arguments, and may set a separate logical relation by using one operator among the operators as an element for calculating an argument as shown in a lower portion of FIG. 7.

In detail, the one or more lower-order keywords displayed on the third interface 2000 may correspond to one or more lower-order keywords used as arguments in the initial logical relation that is preset to the specific higher-order keyword selected by the user as shown in FIG. 4.

Meanwhile, the logical operators displayed in the third interface 2000 may include: a first logical operator for calculating a bill, news, person information, and a report including one lower-order keyword among a plurality of lower-order keywords corresponding to arguments; a second logical operator for calculating a bills, news, person information, and a report including all of the lower-order keywords corresponding to the arguments; and a third logical operator for calculating a bill, news, person information, and a report, which do not include a specific lower-order keyword corresponding to the argument.

In detail, the user may arbitrarily set a relation between one or more lower-order keywords by using the logical operators. The logical operators may include 'OR' corresponding to the first logical operator, 'AND' corresponding to the second logical operator, and 'NOT' corresponding to the third logical operator, and the first logical operator 'OR' may be used as 'A OR B' to calculate two arguments (keywords) so as to derive information (the bill, the news, the person information, and the report) including one or more arguments among the arguments as a search result. The second logical operator 'AND' may be used as 'A AND B' to calculate two arguments (keywords) so as to derive information (the bill, the news, the person information, and the report) including all the arguments as a search result. Finally, the third logical operator 'NOT' may be used as 'A NOT B' to calculate two arguments (keywords) so as to derive information (the bill, the news, the person information, and the report) including a preceding argument but not including a following argument as a search result.

As described above, the user may generate a logical expression having a logical relation different from the initial logical relation that is preset to the specific higher-order keyword by using the lower-order keywords included in the selected specific higher-order keyword and the provided logical operators, and service information including one or more information matching the logical expression generated as described above may be displayed on the content layer L20 of the second interface, so that detailed search results according to the request to the user may be additionally provided without being limited to the preset initial logical relation.

Meanwhile, according to another embodiment of the present invention, other logical operators may be additionally included in addition to the first logical operator, the second logical operator, and the third logical operator.

Figure 8:
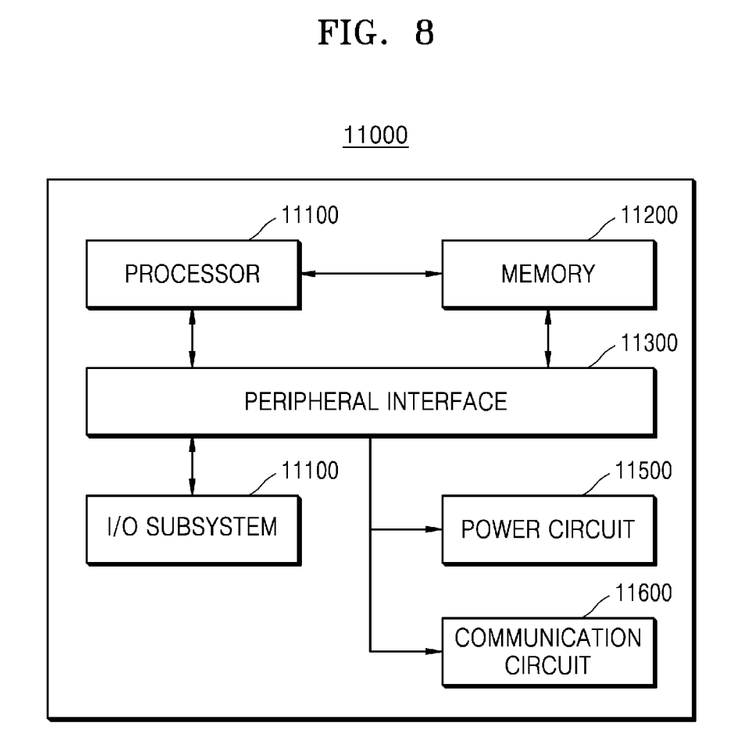
FIG. 8 schematically shows internal components of the computing device according to one embodiment of the present invention.

FIG. 8 schematically shows internal components of the computing device according to one embodiment of the present invention.

The above-described computing system 100 shown in FIG. 1 may include components of the computing device 11000 shown in FIG. 8.

As shown in FIG. 8, the computing device 11000 may at least include at least one processor 11100, a memory 11200, a peripheral device interface 11300, an input/output subsystem (I/O subsystem) 11400, a power circuit 11500, and a communication circuit 11600. The computing device 11000 may correspond to the computing system 100 shown in FIG. 1.

The memory 11200 may include, for example, a high-speed random access memory, a magnetic disk, an SRAM, a DRAM, a ROM, a flash memory, or a non-volatile memory. The memory 11200 may include a software module, an instruction set, or other various data necessary for the operation of the computing device 11000.

The access to the memory 11200 from other components of the processor 11100 or the peripheral interface 11300, may be controlled by the processor 11100.

The peripheral interface 11300 may combine an input and/or output peripheral device of the computing device 11000 to the processor 11100 and the memory 11200. The processor 11100 executes the software module or the instruction set stored in memory 11200, thereby performing various functions for the computing device 11000 and processing data.

The I/O subsystem may combine various input/output peripheral devices to the peripheral interface 11300. For example, the input/output subsystem may include a controller for combining the peripheral device such as monitor, keyboard, mouse, printer, or a touch screen or sensor, if needed, to the peripheral interface 11300. According to another aspect, the input/output peripheral devices may also be combined to the peripheral interface 11300 without passing through the I/O subsystem.

The power circuit 11500 may provide power to all or a portion of the components of the terminal. For example, the power circuit 11500 may include a power management system, at least one power source charging system for a battery or alternating current (AC), a power failure detection circuit, a power converter or inverter, a power status indicator, or any other components for generating, managing, and distributing the power.

The communication circuit 11600 uses at least one external port, thereby enabling communication with other computing devices.

Alternatively, as described above, the communication circuit 11600 may include an RF circuit, if needed, to transmit and receive an RF signal, also known as an electromagnetic signal, thereby enabling communication with other computing devices.

The embodiment of FIG. 8 is merely an example of the computing device 11000, and the computing device 11000 may have a configuration or arrangement in which some components shown in FIG. 8 may be omitted, additional components not shown in FIG. 8 may be further provided, or at least two components may be combined. For example, a computing device for a communication terminal in a mobile environment may further include a touch screen, a sensor or the like in addition to the components shown in FIG. 8. The communication circuit 11600 may include a circuit for RF communication of various communication schemes (such as WiFi, 3G, LTE, Bluetooth, NFC, and Zigbee). The components that may be included in the computing device 11000 may be implemented by hardware, software, or a combination of both hardware and software which include at least one integrated circuit specialized in a signal processing or an application.

The methods according to the embodiments of the present invention may be implemented in the form of program instructions to be executed through various computing devices, so as to be recorded in a computer-readable medium. In particular, a program according to an embodiment of the present invention may be configured as a PC-based program or an application dedicated to a mobile terminal. The application to which the present invention is applied may be installed in the computing device 11000 through a file provided by a file distribution system. For example, a file distribution system may include a file transmission unit (not shown) that transmits the file according to the request of the computing device 11000.

The above-mentioned device may be implemented by hardware components, software components, and/or a combination of hardware components and software components. For example, the devices and components described in the embodiments, may be implemented by using at least one general purpose computer or special purpose computer, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. For the further understanding, in regard to the processing device, some cases may have described that one processing device is used, however, it will be appreciated by those skilled in the art that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, a code, an instruction, or a combination of at least one thereof, and may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, computer storage medium or device, or in a signal wave to be transmitted. The software may be distributed over computing devices connected to networks, so as to be stored or executed in a distributed manner. Software and data may be stored in at least one computer-readable recording media.

The method according to the embodiment may be implemented in the form of program instructions to be executed through various computing mechanisms, so as to be recorded in a computer-readable medium. The computer-readable medium may include program instructions, data files, data structures, and the like, independently or in combination thereof. The program instructions recorded on the medium may be specially designed and configured for the embodiment, or may be known to those skilled in the art of computer software so as to be used. An example of the computer-readable medium includes a magnetic medium such as a hard disk, a floppy disk and a magnetic tape, an optical medium such as a CD-ROM and a DVD, a magneto-optical medium such as a floptical disk, and a hardware device specially configured to store and execute a program instruction such as ROM, RAM, and flash memory. An example of the program instruction includes a high-level language code to be executed by a computer using an interpreter or the like, as well as a machine code generated by a compiler. The above hardware device may be configured to operate as at least one software module to perform the operations of the embodiments, and vise versa.

According to one embodiment of the present invention, when the company information and the industry information are received from the user, one or more higher-order keywords corresponding to the company information and the industry information are derived, and service information including a bill, news, person information, and a report to which one or more lower-order keywords corresponding to a positive logical relation are mapped is provided to the user according to an initial logical relation that is set between one or more lower-order keywords assigned to each of the one or more higher-order keywords, so that the service information on the bill, the news, the person information, and the report, which are related to the company information and the industry information input by the user and do not directly include the company information and the industry information, can be provided.

According to one embodiment of the present invention, the user may arbitrarily change the initial logical relation between one or more preset lower-order keywords with respect to the specific higher-order keyword selected by the user through the third interface provided to the user terminal, so that detailed search results required by the user can be provided in addition to the initial logical relation.

According to one embodiment of the present invention, when the company information is received from the user through the company information input region included in the first interface, one or more candidate industry information corresponding to the company information may be displayed, and the user may receive the industry information by selecting specific candidate industry information among the candidate industry information, so that the user can easily input the industry information related to the company information.

Although the above embodiments have been described with reference to the limited embodiments and drawings, however, it will be understood by those skilled in the art that various changes and modifications may be made from the above-mentioned description For example, even though the described descriptions may be performed in an order different from the described manner, and/or the described components such as system, structure, device, and circuit may be coupled or combined in a form different from the described manner, or replaced or substituted by other components or equivalents, appropriate results may be achieved.

Therefore, other implementations, other embodiments, and equivalents to the claims are also within the scope of the following claims.

What is claimed is:

1. A method for providing service information including a bill customized to a user, which is performed in a computing system configured to perform communication with a user terminal and including one or more processors and one or more memories, the method comprising:
    a first interface provision step of providing a first interface for receiving company information and industry information to the user terminal, in which each of a plurality of bills, a plurality of news, a plurality of person information, and a plurality of reports stored in the computing system is mapped to one or more lower-order keywords;
    a higher-order keyword derivation step of deriving one or more higher-order keywords based on the company information and the industry information received through the first interface in the user terminal, wherein the derived one or more higher-order keywords are broad generic public terms representing a wider range of topics and fit with the received company information and the industry information; and
    a second interface provision step of providing a second interface for displaying one or more information corresponding to the derived one or more higher-order keywords among the bills, the news, the person information, and the reports to the user terminal,
    wherein in response to the user's selection of the one or more higher-order keywords, a set of the lower-order keywords is automatically used for corresponding searches based on a predetermined format, where the lower-order keywords are synonyms or specific terms related to any one of the selected higher-order keyword, the company and the industry information; and
    wherein the selected higher-order keyword returns results from bills, news, person information, and reports containing any lower-order keyword,
    the second interface at the user device includes:
        a higher-order keyword layer for displaying the one or more higher-order keywords derived in the higher-order keyword derivation step; and
        a content layer for displaying the one or more information among the bills, the news, the person information, and the reports corresponding to a specific higher-order keyword selected by the user in the higher-order keyword layer, and
    the one or more information displayed in the content layer corresponds to one or more of bills, news, person information, and reports to which the one or more lower-order keywords corresponding to a positive logical relation are mapped according to an initial logical relation that is set to the selected specific higher-order keyword.

2. The method of claim 1, further comprising a third interface provision step of providing a third interface through which the user sets the initial logical relation that is set to the specific higher-order keyword selected by the user in the higher-order keyword layer to the user terminal according to a request of the user terminal,
    wherein a plurality of preset logical operators are displayed in the third interface provided in the third interface provision step, and
    the user changes the initial logical relation for the specific higher-order keyword by using the one or more lower-order keywords that are set to the selected specific higher-order keyword and one or more logical operators included in the logical operators through the third interface.

3. The method of claim 2, wherein the logical operators displayed in the third interface include:
    a first logical operator for calculating a bill, news, person information, and a report including one lower-order keyword among a plurality of the lower-order keywords corresponding to arguments;
    a second logical operator for calculating a bill, news, person information, and a report including all of the lower-order keywords corresponding to the arguments; and
    a third logical operator for calculating a bill, news, person information, and a report, which do not include a specific lower-order keyword corresponding to the argument.

4. The method of claim 1, wherein the first interface provided through the first interface provision step includes:
    a company information input region for receiving the company information; and
    a candidate list display region for displaying a plurality of preset candidate industry information according to the company information with respect to the company information received in the company information input region, and
    specific candidate industry information selected by the user among the candidate industry information displayed in the candidate list display region corresponds to the industry information.

5. The method of claim 1, wherein each of the bills, the news, the person information, and the reports stored in the computing system is further mapped to one or more company information or one or more industry information, and
the one or more information displayed in the content layer correspond to one or more information matching the initial logical relation that is set to the specific higher-order keyword among a plurality of bills, a plurality of news, a plurality of person information, and a plurality of reports, which are mapped to company information or industry information corresponding to the selected specific higher-order keyword.

6. A computer-readable medium for implementing a method for providing service information including a bill customized to a user, which is performed in a computing system configured to perform communication with a user terminal and including one or more processors and one or more memories, wherein the computer-readable medium stores instructions for causing the computing system to perform:
a first interface provision step of providing a first interface for receiving company information and industry information to the user terminal, in which each of a plurality of bills, a plurality of news, a plurality of person information, and a plurality of reports stored in the computing system is mapped to one or more lower-order keywords;
a higher-order keyword derivation step of deriving one or more higher-order keywords based on the company information and the industry information received through the first interface in the user terminal, wherein the higher-order keywords are broad generic public terms representing a wider range of topics and fit with the company information and the industry information; and
a second interface provision step of providing a second interface for displaying one or more information corresponding to the derived one or more higher-order keywords among the bills, the news, the person information, and the reports to the user terminal,
wherein, in response to the user's selection of the one or more higher-order keywords, a set of the lower-order keywords is automatically used for corresponding searches based on a predetermined format, where the lower-order keywords are synonyms or specific terms related to any one of the selected higher-order keyword, the company and the industry information; and
wherein the selected higher-order keyword returns results from bills, news, person information, and reports containing any lower-order keyword,
the second interface provided in the second interface provision step includes:
a higher-order keyword layer for displaying the one or more higher-order keywords derived in the higher-order keyword derivation step; and
a content layer for displaying the one or more information among the bills, the news, the person information, and the reports corresponding to a specific higher-order keyword selected by the user in the higher-order keyword layer, and
the one or more information displayed in the content layer corresponds to one or more of bills, news, person information, and reports to which the one or more lower-order keywords corresponding to a positive logical relation are mapped according to an initial logical relation that is set to the selected specific higher-order keyword.

* * * * *